(12) United States Patent
Kwon et al.

(10) Patent No.: US 9,078,111 B2
(45) Date of Patent: Jul. 7, 2015

(54) METHOD FOR PROVIDING VOICE CALL USING TEXT DATA AND ELECTRONIC DEVICE THEREOF

(71) Applicant: Samsung Electronics Co. Ltd., Suwon-si, Gyeonggi-do (KR)

(72) Inventors: Ho-Min Kwon, Seoul (KR); So-Jeong Im, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/939,815

(22) Filed: Jul. 11, 2013

(65) Prior Publication Data

US 2014/0051410 A1 Feb. 20, 2014

(30) Foreign Application Priority Data

Aug. 16, 2012 (KR) .......................... 10-2012-0089696

(51) Int. Cl.
*H04W 4/16* (2009.01)
*G10L 13/00* (2006.01)
*H04M 1/725* (2006.01)

(52) U.S. Cl.
CPC ................. *H04W 4/16* (2013.01); *G10L 13/00* (2013.01); *H04M 1/7255* (2013.01); *H04M 1/72552* (2013.01)

(58) Field of Classification Search
USPC .................... 455/412.1, 414.1, 414.3, 414.4
See application file for complete search history.

(56) References Cited

U.S. PATENT DOCUMENTS

2008/0201438 A1  8/2008  Mandre
2011/0111805 A1  5/2011  Paquier et al.

FOREIGN PATENT DOCUMENTS

KR  10-2004-0083716 A  10/2004
KR  10-2005-0121130 A  12/2005
WO  2007/048727 A1  5/2007

*Primary Examiner* — Sam Bhattacharya
(74) *Attorney, Agent, or Firm* — Jefferson IP Law, LLP (57) ABSTRACT

A method for providing a voice call using text data and an electronic device thereof are provided. The method includes converting the detected text data into audio data when an input of the text data is detected during call connection, and converting the converted audio data into a digital signal to transmit the converted digital signal to another party.

11 Claims, 10 Drawing Sheets

METHOD FOR PROVIDING VOICE CALL USING TEXT DATA AND ELECTRONIC DEVICE THEREOF

PRIORITY

This application claims the benefit under 35 U.S.C. §119 of a Korean patent application filed on Aug. 16, 2012 in the Korean Intellectual Property Office and assigned Serial No. 10-2012-0089696, the entire disclosure of which is hereby incorporated by reference.

BACKGROUND OF THE INVENTION

1. Field of the Invention

The present invention relates to a method of providing a voice call using text data in an electronic device and the electronic device thereof.

2. Description of the Related Art

With the recent rapid development of electronic devices, electronic devices capable of providing wireless voice calls and information exchanges have become necessities of life. When the electronic devices were initially spread, it was recognized that the electronic devices were easy to carry and to use for wireless calls. However, as this technology is developed further and as the wireless internet further improves, the application range of electronic devices has become more extensive (for example, games, remote controllers using short range communication, and image capture using a mounted digital camera in addition to the purpose of simple phone calls or scheduling, and the like), and thus the needs of users have been satisfied.

Manufacturers offer electronic devices with more add-on functions and attempt to improve the convenience to users using the wireless call function, that is, one of the original features of the electronic devices.

The recently released electronic devices provide Text To Speech (TTS) technology.

TTS is a technology that converts text data into voice data. By using the TTS function, for example, an electronic device may output the contents of text data received, and may output the contents of an e-book, as voice data, or may guide the function items of the electronic device as voice data.

In addition, upon receiving a call, an electronic device can convert a caller's information into voice data and then output the converted voice data using the TTS function. Since this also converts caller's information displayed on an output screen of the electronic device into voice data, and also provides the converted voice data, when a user cannot directly control the electronic device in a certain situation (for example, while driving), such a TTS function utilization increases.

However, existing electronic devices cannot take advantage of the TTS function during call connection, and thus, can convert only text data outputted on a display screen thereof into voice data.

For example, after refusing to receive an incoming call when a voice call is unavailable, a user may notify the other party using text data that the voice call is unavailable, and an electronic device receiving the text data may output the contents of the received text data as voice data through the TTS function. However, a voice received from the other party during call connection cannot be outputted as text.

Furthermore, since an electronic device can receive a user's voice data and provide it to the other party, personal information may be exposed to others when voice data occurs.

Therefore, a need exits for an electronic device and related method capable of making a voice call using text data.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a device and method of making a voice call using text data input by a user in an electronic device.

Another aspect of the present invention is to provide a device and method for notifying another party about the user's text input start and end in the electronic device.

Another aspect of the present invention is to provide a device and method for converting text data inputted during a call connection into audio data in the electronic device.

Another aspect of the present invention is to provide a device and method for converting audio data received from another party into text data in the electronic device.

In accordance with an aspect of the present invention, a method for providing a voice call in an electronic device is provided. The method includes converting the detected text data into audio data when an input of text data is detected during call connection, and converting the converted audio data into a digital signal to transmit the converted digital signal to another party.

The method may further include generating information notifying that text data are being entered and transmitting the generated information to the other party before the detected text data are converted into audio data when the input of text data is detected during call connection.

The information notifying that text data are being entered may use at least one of audio data, video data, and icons.

The method may further include converting audio data received from the other party during call connection into text data and outputting the converted text data.

The converting of the detected text data into the audio data when the input of the text data is detected during the call connection may include activating a text data input mode when an instruction for converting text data into audio data is detected during the call connection.

In accordance with another aspect of the present invention, a device for providing a voice call in an electronic device is provided. The device includes at least one processor, a memory, and at least one program stored in the memory and configured to be executed by the at least one processor, wherein the at least one program includes an instruction that, when an input of text data is detected during call connection, converts the detected text data into audio data and converting the converted audio data into a digital signal to transmit the converted digital signal to the other party.

The at least one program may include an instruction that, when an input of text data is detected during call connection, generates information notifying that text data are being entered and transmits the generated information to the other party before converting the detected text data into audio data.

The at least one program may include an instruction using the information notifying that the text data are being entered using at least one of audio data, video data, and icons.

The at least one program may include an instruction for converting audio data received from the other party during call connection into text data, and for outputting the converted text data.

The at least one program may include an instruction that, when an instruction that converting text data into audio data during the call connection is detected, activates a text data input mode.

In accordance with another aspect of the present invention, a non-transitory computer readable recording medium having at least one program with instructions recorded thereon, which, when executed by an electronic device, implement the method is provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a device and method for allowing a voice call using text data in an electronic device according to embodiments of the present invention will be described. In embodiments, the voice call using text data outputs audio data received from the other party as text data, and also converts text data inputted by a user into audio data and then transmits the converted audio data to the other party.

The voice call using text data outputs audio data received from the other party through a speaker if necessary, and also converts text data inputted by a user into audio data and then transmits the converted audio data to the other party.

That is, the voice call using text data is employed by a user that communicates with the other party using text data in a place in which a voice call is unavailable. At this point, at least the other party transmits/receives audio data as if making a voice call. Furthermore, the electronic device may transmit to the other party audio data notifying that text is being entered.

In embodiments, the electronic device may be a portable electronic device, and also may be a device such as a portable terminal, a mobile phone, a media player, a tablet computer, a handheld computer, or a Personal Digital Assistant (PDA). Additionally, the electronic device may be an arbitrary portable electronic device combining at least two functions among such devices. In embodiments, the text data may be a message that is to be delivered to the other party using an input device. According to an exemplary embodiment of the present invention, the electronic device may include any kind of an electronic device including a display and an input means. For example, the electronic device may include a desktop computer, a refrigerator, a multi-function peripheral, a video game console, a digital camera, a Mobile Internet Device (MID), an Ultra Mobile PC (UMPC), a navigation device, a smart TV, a digital watch, and an MP3 player.

Exemplary embodiments below relating to an electronic device including a touch screen are described. However, it is apparent to those of ordinary skill in the art that exemplary embodiments in this specification may be appropriately applied to an electronic device or a computing device having another input means different from a display, even if not including a touch screen.

Figure 1:
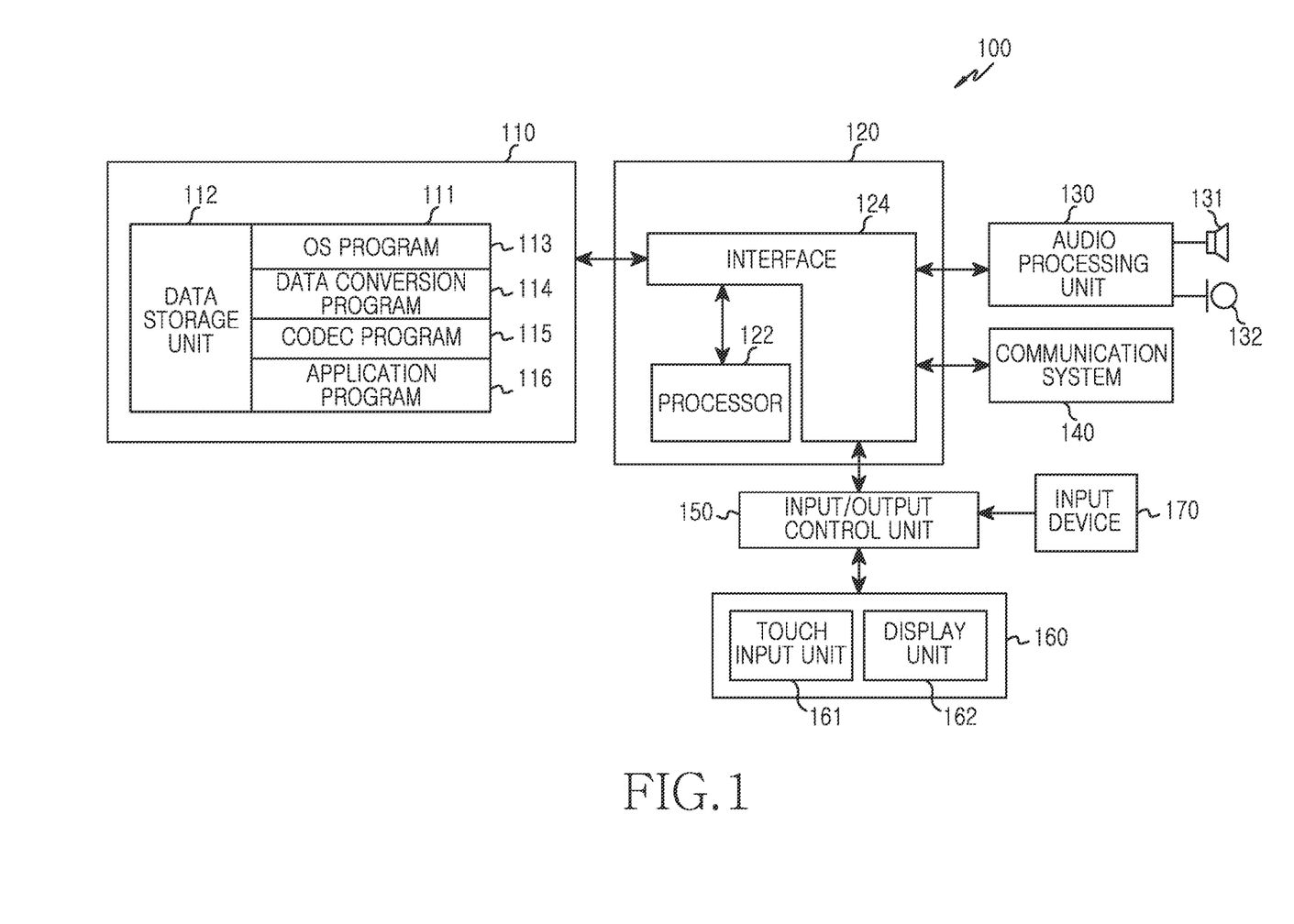
FIG. 1 is a block diagram illustrating a configuration of an electronic device performing a voice call using text data according to an exemplary embodiment of the present invention.

FIG. 1 is a block diagram illustrating a configuration of an electronic device performing a voice call using text data according to an exemplary embodiment of the present invention.

Referring to FIG. 1, the electronic device 100 may include a memory 110, a processor unit 120, an audio processing unit 130, a communication system 140, an input/output control unit 150, a touch screen 160, and an input device 170. In embodiments, at least one component of the mentioned configuration may include two or more components. For example, the electronic device 100 may include one or more memories 110 and communication systems 140.

Various components will be described as follows.

The memory 110 may include a program storage unit 111 storing a program for controlling an operation of the electronic device 100 and a data storage unit 112 storing data generated during program execution. For example, the data storage unit 112 may store updatable various data for storage such as phone books, outgoing messages and incoming messages, and also may store audio data corresponding to words and sentences inputted by a user according to embodiments of the present invention. In embodiments, the audio data corresponding to words and sentences may be vocalization data for sentences or words representing an input unit supporting numbers, English alphabet, and Korean alphabet. For example, the audio data may be vocalization data for English word "school" and also may be vocalization data for Korean word "Hak Kyo".

Additionally, the program storage unit 111 may include an Operating System (OS) program 113, a data conversion program 114, a coder-decoder (CODEC) program 115, and at least one application program 116. In embodiments, a program included in the program storage unit 111 may be expressed in an instruction set as a set of instructions. In embodiments, a program included in the program storage unit 111 may be expressed in a hardware configuration. For example, the electronic device 100 may include an OS module, a data conversion module, and a CODEC module.

The OS program 113 may include various software components controlling general system operations. Controlling such a general system operation may, for example, mean memory management and control, storage hardware (device) control and management, and power control and management, and the like. The OS program 113 may serve to allow smooth communication between hardware (e.g., devices) and program components (e.g., modules).

The data conversion program 114 may include at least one software component processing and converting text data inputted by a user into audio data during call connection. That is, the data conversion program 114 may convert the contents of text data as if voice data occurred by a user. For example, the data conversion program 114 may analyze text data inputted by a user and may obtain vocalization data corresponding to the text data from the memory 110.

The data conversion program 114 may be a TTS program.

In embodiments, the data conversion program 114 may generate information indicating that text is being entered when confirming that a user inputs text data during call connection.

The data conversion program 114 may convert audio data received from the other party into text data so as to output the contents of audio data to be displayed on the display unit 162.

The CODEC program 115 may include at least one software component processing and converting transmitted/received data to perform a voice call.

In embodiments, the CODEC program 115 may convert received digital data into analog voice signals, and then provide them to the audio processing unit 130, and may also convert audio data from a user into digital data, and then provide them to the audio processing unit 130.

Additionally, the CODEC program 115 may process and convert audio data converted by the data conversion program 114 (that is, audio data in which the contents of text data inputted by a user are converted) into digital data.

As well, the CODEC program 115 may process and convert information notifying that text data converted by the data conversion program 114 are being converted into digital signals.

The application program 116 may include a software component for at least one application program installed in the electronic device 100. The application program 116 may include a program allowing a voice call using text data according to embodiments of the present invention.

The processor unit 120 may include at least one processor 122 and interface 124. In embodiments, the processor 122 and the interface 124 may be integrated as one circuit or may be implemented using an additional component.

The interface 124 may serve as a memory interface controlling access of the processor 122 and the memory 110.

Also, the interface 124 may serve as a peripheral interface controlling connection between an input/output peripheral device and the processor 122 of the electronic device 100.

The processor 122 may control the electronic device 100 to provide a voice call function using text data through at least one software program. In embodiments, the processor 122 may execute at least one program stored in the memory 110 to process and convert audio data received from the other party into text data, and also convert text data inputted by a user into audio data and then provide them to the other party. For example, the processor 122 may include a data conversion engine 210 of FIG. 2 converting transmission data. That is, a voice call using text data in the electronic device may be performed using software such as a program stored in the memory 110 and hardware such as the data conversion engine 210.

The processor 122 may generate information notifying that a user currently enters text through the data conversion program 114. However, according to embodiments of the present invention, the processor 122 may transmit to the other party various data such as video data and icons that are pre-stored to notify that text data are being entered. In embodiments, since the video data and icons that are pre-stored to notify that text data are being entered do not need to be converted into digital data, the processor 122 may provide the video data and icons to the other party immediately through the communication system 140.

The audio processing unit 130 may provide an audio interface between a user and the electronic device 100 through a speaker 131 and a microphone 132.

The communication system 140 may perform a communication function for voice communication and for data communication of the electronic device 100. In embodiments, the communication system may include more than one communication sub module, each supporting different communication networks. For example, a communication network is not limited to the above, and may include Global System for Mobile Communication (GSM) network, Enhanced Data GSM Environment (EDGE) network, Code Division Multiple Access (CDMA) network, W-Code Division Multiple Access (W-CDMA) network, Long Term Evolution (LTE) network, Orthogonal Frequency Division Multiple Access (OFDMA) network, wireless LAN, Bluetooth network, and Near Field Communication (NFC). That is, the communication system 140 may transmit/receive data (for example, information notifying that text data are being entered and audio data including the contents of text data) necessary for a voice call using text data according to embodiments of the present invention.

The input/output control unit 150 may provide an interface between an input/output device such as a touch screen 160 and an input device 170 and an interface.

The touch screen 160, as an input/output device for outputting/inputting information, may include a touch input unit 161 and a display unit 162.

The touch input unit 161 may provide touch information obtained through a touch panel to the processor unit 120 through the input/output control unit 150. In embodiments, the touch input unit 161 may change touch information into an instruction structure such as a touch_down, a touch_move, and a touch_up, and then may provide it to the processor unit 120.

The display unit 162 may display state information of the electronic device 100, of text entered by a user, of moving pictures, and of still pictures. For example, the display unit 162 may output the contents of audio data received from the other party as text data. In embodiments, the display unit 162 may output contents to be transmitted to the other party as text data.

The touch input unit 170 may provide input data generated by a user's selection to the processor unit 120 through the input/output control unit 150. For example, the input device 170 may be configured including only a control button for controlling the electronic device 100. As another example, the input device 170 may be configured with a keypad for receiving input data from a user. Such an input device 170 may generate an input on contents to be transmitted to the other party according to embodiments of the present invention.

Although not shown, the electronic device 100 may further include components for providing additional functions such as a camera module capturing an image or moving picture, a broadcast receiving module receiving a broadcast, a digital music playing module such as an MP3 module, a short-range wireless communication module for short-range wireless communication, and a proximity sensor module for proximity sensing and also, software for operations thereof.

Figure 2:
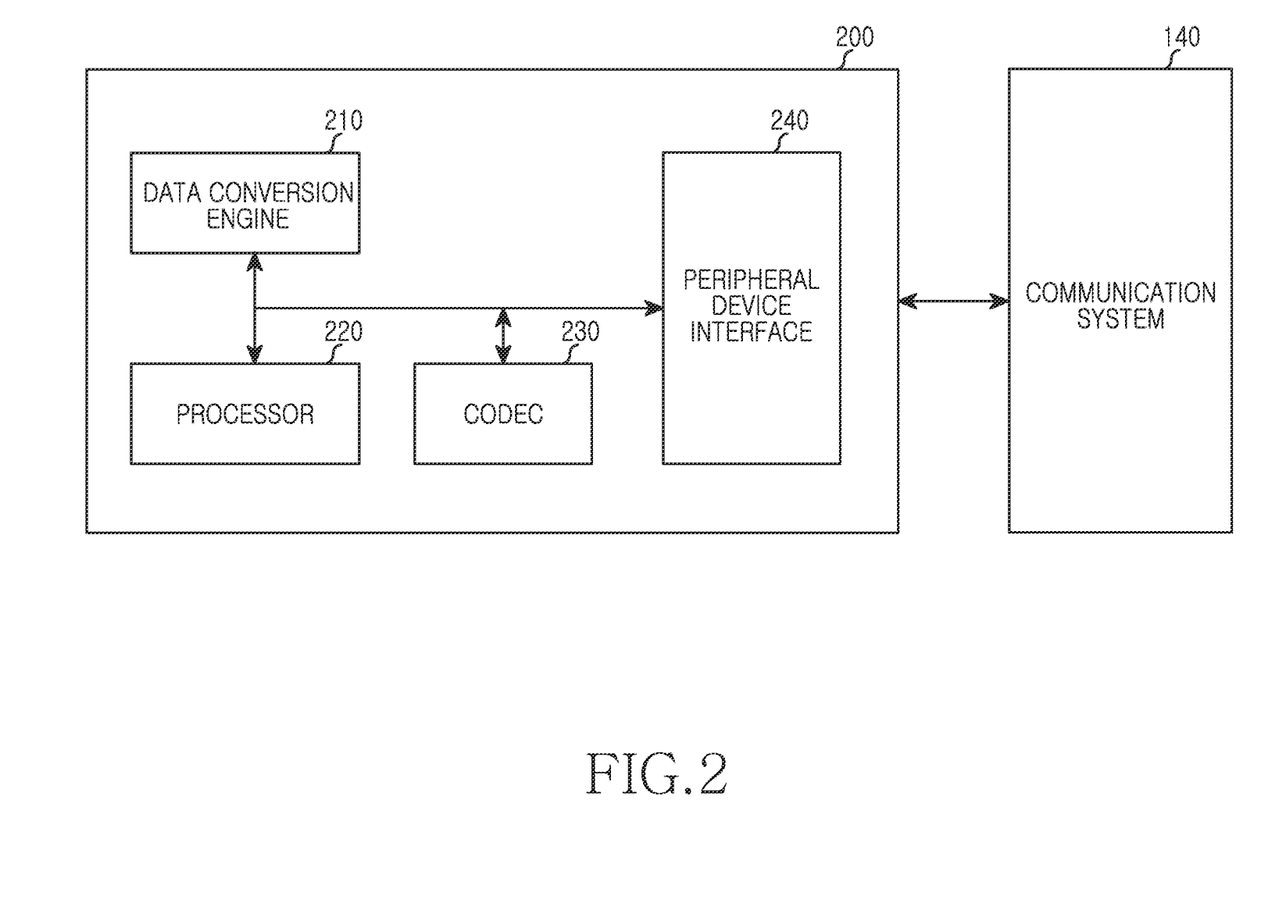
FIG. 2 is a view illustrating components of a processor unit for providing a voice call function using text data according to an exemplary embodiment of the present invention.

FIG. 2 is a view illustrating components of the processor unit 120 for providing a voice call function using text data according to an exemplary embodiment of the present invention.

Referring to FIG. 2, the processor unit 200 may be configured including a data conversion engine 210, a processor 220, a CODEC 230, and a peripheral device interface 240. In embodiments, in the CODEC 230, a function of the CODEC program 115 stored in the memory 110 is configured by hardware. In embodiments, the data conversion engine 210 configures the data conversion program 114 stored in the memory 110 of FIG. 1 by hardware.

That is, an electronic device according to embodiments of the present invention may provide a voice call function using text data through the stored program of FIG. 1. In embodiments, a voice call function using text data may be provided using the processor unit 200 configured by hardware shown in FIG. 2.

The processor 220 of the processor unit 200 may perform a method according to an exemplary embodiment of the present invention in linkage with the data conversion engine 210, the CODEC 230, and at least one program stored in the memory 110. According to an exemplary embodiment of the present invention, the processor 220 processes and converts text data inputted by a user into audio data during call connection in linkage with the data conversion engine 210. At this point, the data conversion engine 210 may convert text data into audio data through a TTS program.

In embodiments, when it is confirmed that a user inputs text data, the processor 220 may generate information indicating that text is being entered in linkage with the data conversion engine 210.

The processor 220 may convert audio data received from the other party into text data in linkage with the data conversion engine 210 so as to output the contents of the audio data to be displayed on the display unit 162.

Additionally, the processor 220 may process and convert transmission data to perform a voice call in linkage with the CODEC 230. That is, the processor 220 may process and convert digital data of the other party received through the communication system 140 and the peripheral interface 240 into analog voice signals through the CODEC 230.

Additionally, the processor 220 may convert audio data converted by the data conversion engine 210 (that is, audio data in which the contents of text data inputted by a user are converted) into digital data using the CODEC 230, and then may process and transmit the converted digital data to the other party through the peripheral interface 240 and the communication system 140.

In embodiments, the processor 220 may convert information notifying that text data converted by the data conversion program 114 are being entered into digital data using the CODEC 230, and then may process and transmit the converted information to the other party through the peripheral interface 240 and the communication system 140.

Figure 3:
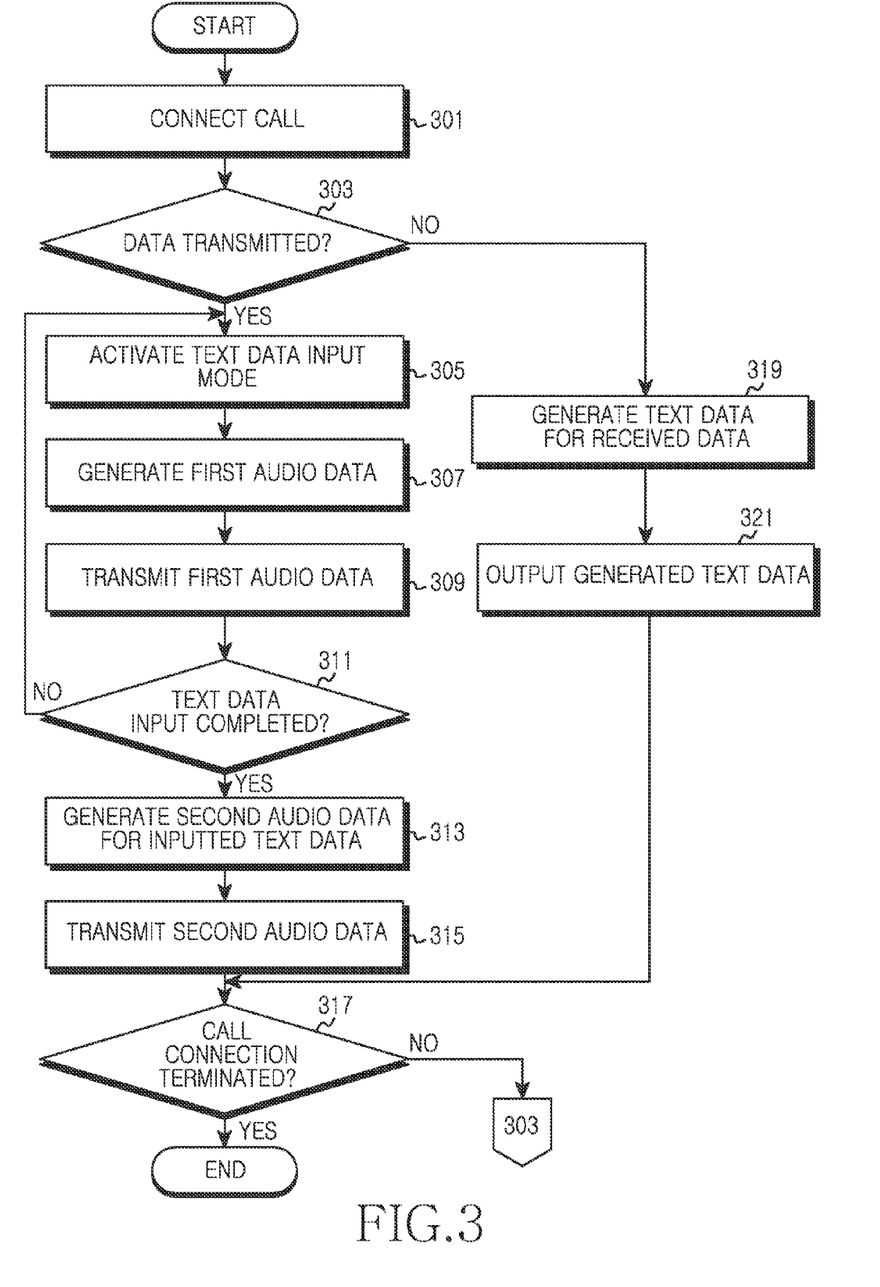
FIG. 3 is a flowchart illustrating an operation of performing a voice call using text data in an electronic device according to an exemplary embodiment of the present invention.

FIG. 3 is a flowchart illustrating an operation of performing a voice call using text data in an electronic device according to an exemplary embodiment of the present invention.

Referring to FIG. 3, the electronic device outputs audio data received from the other party as text data, converts text data inputted by a user into audio data, and transmits the converted audio data to the other party so that a voice call using text data is possible. In embodiments, the electronic device may transmit to the other party audio data notifying that text is being entered.

That is, the electronic device allows a voice call with the other party in a place in which a voice call is unavailable.

In order to perform the above operation, the electronic device performs a call connection with the other party in step 301 and proceeds to step 303 to confirm whether to transmit data to the other party. In step 303, it is confirmed whether to transmit audio data to the other party or whether to receive audio data from the other party.

When audio data are received from the other party in step 303, the electronic device proceeds to step 319 to generate the received audio data as text data, and then proceeds to step 321 to process and output the generated text data. That is, the electronic device may output the contents of audio data as text data. This is to maintain a call connection with the other party even when a user is in a voice call unavailable area (for example, meeting rooms and theaters). For example, the electronic device may convert a voice received from the other party into text data and outputs the converted text data to a screen, without outputting the voice to a speaker. Of course, the electronic device may allow a voice call using text data while outputting audio data received from the other party through a speaker. This will be further described below with reference to FIG. 4.

Moreover, when data are transmitted to the other party in step 303, the electronic device proceeds to step 305 to activate a text data input mode and then receive text data from a user. This means writing contents to be delivered to the other party as text, instead of inputting the contents as voice.

Then, the electronic device proceeds to step 307 to generate audio data (hereinafter, referred to as first audio data) notifying that text data are being entered by a user, and then proceeds to step 309 to transmit the generated audio data to the other party. Due to this, the other party receiving the first audio data confirms that since a user of the electronic device is in a meeting room or theater, a voice call is unavailable and thus is performed using text data. Then, the other party may wait until audio data obtained by converting text data are received. At this point, the electronic device may use typing sound as the first audio data. Of course, the electronic device may provide various audio data notifying that text data are being entered so that a user may select preferred audio data. In embodiments, the electronic device may notify to the other party that text data are being entered using various kinds of data such as video data, image data, and icons.

As mentioned above, in a normal voice call, after the voice of the other party is received, the voice of the user is instantly delivered to the other party. However, when a voice call is performed using text data according to embodiments of the present invention, until a text input of a user is completed after a voice is received from the other party, the other party may not confirm which situation the user is in. Accordingly, the electronic device may provide to the other party information notifying the other party of a situation in which the user inputs the contents to be delivered as voice as text data.

Then, the electronic device proceeds to step 311 to confirm whether text data input is completed. This is to confirm whether voice contents to be delivered to the other party are written as text data. For example, the electronic device determines that text input is completed when a completion button (or a send button) of a text data input function is inputted.

If it is determined that text data input is not completed in step 311, the electronic device proceeds to step 305 to provide to the other party audio data notifying that text data are being entered until the text data input is completed.

When it is confirmed that text data input is completed in step 311, the electronic device proceeds to step 313 to generate audio data (hereinafter, referred to as second audio data) on the inputted text data. At this point, the electronic device may convert text data inputted by a user into audio data through a TTS technique.

Then, the electronic device proceeds to step 315 to convert the audio data generated in step 313 into digital signals and then transmit the converted digital signals to the other party, and proceeds to step 317 to confirm whether a call connection with the other party is terminated.

If it is confirmed that a call connection with the other party is not terminated in step 317, the electronic device performs step 303 again.

If it is confirmed that a call connection with the other party is terminated in step 317, the electronic device terminates an algorithm of embodiments of the present invention.

In FIG. 3, when text data input occurs during call connection, operations of an electronic device related to notifying the other party of the text data input are described.

However, a user of the electronic device may also execute a text input available application during a call connection with the other party. For example, the electronic device may save call contents as a memo file by executing a memo application during call connection.

In this case, since it is not a situation in which contents to be delivered as voice are inputted as text data, the electronic device does not need to notify to a user about a situation in which text data are being entered.

Accordingly, the electronic device defines an instruction (or a menu) for performing a voice call using text data due to an unavailable voice call, and activates the function for performing a voice call using text data. Only when the function is activated, the electronic device may notify the other party about a situation in which text data are being entered.

Figure 4:
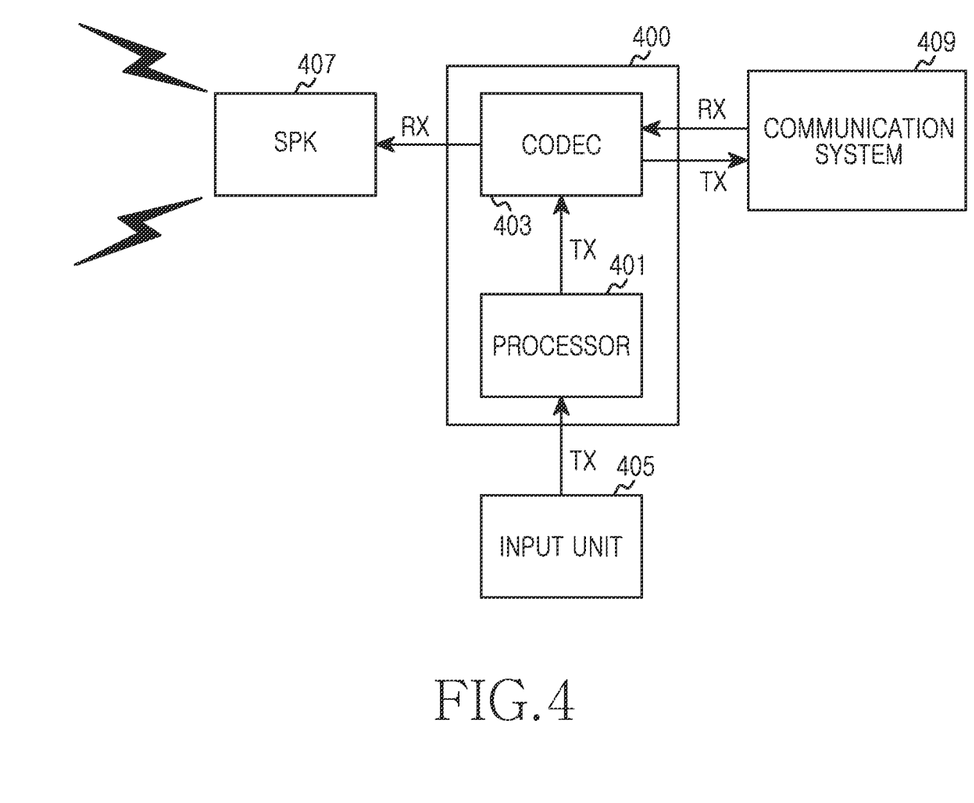
FIG. 4 is a view illustrating operations of an electronic device providing a voice call function according to an exemplary embodiment of the present invention.

FIG. 4 is a view illustrating operations of an electronic device providing a voice call function according to an exemplary embodiment of the present invention.

Referring to FIG. 4, the electronic device controls a processor unit 400 configured with a processor 401 and a CODEC 403 to perform a voice call. The electronic device may also include an input unit 405, and may be coupled with a speaker 407 and a communication system 409.

That is, the processor unit 400 of the electronic device decodes voice data of the other party received through a communication system to output the decoded voice data through a speaker 407. The processor unit may output voice data of the other party using a headset, a headphone, an earphone, or an ear set besides the speaker. In the drawing, an RX signal received from the other party is converted into an analog signal through the CODEC 403 and the converted analog signal is output through a speaker.

In general, the electronic device converts audio data of a user inputted through a microphone into digital data using the CODEC, and delivers the converted digital data to the other party through a communication system.

Generating voice data by a user to deliver them to the other party means exposing delivery contents to other users around the user.

This is, private contents between a user and the other party may be exposed to other people and voice data occurrence may provide discomfort to others in a public place.

In order to solve the above problems, a processor unit of an electronic device according to embodiments of the present invention may provide a voice call function using text data.

In order to use the above function, a user inputs contents to be transmitted as voice data as text data instead of delivering contents to the other party using voice data.

Accordingly, the processor unit converts text data inputted by a user into voice data and then, provides the converted voice data to the other party through the CODEC and the communication system.

A TX signal shown in FIG. 4 means that text data inputted by a user are converted into audio data.

That is, the processor unit may output data received from the other party as audio signals, and may generate contents to be delivered to the other party through text data input.

Although an example of text data inputted by a user converted into audio data and transmitted is described in FIG. 4, the processor unit of the electronic device may provide only information notifying that text data are being entered until input text data are completed. This is to notify the other party about text data input before text data inputted by a user are converted into audio data and transmitted, in order to stop a call connection before the other party receives audio data. That is, a user may stop a voice call in advance before audio data are received by confirming a call connection available state of the other party through information notifying text data input.

Figure 5:
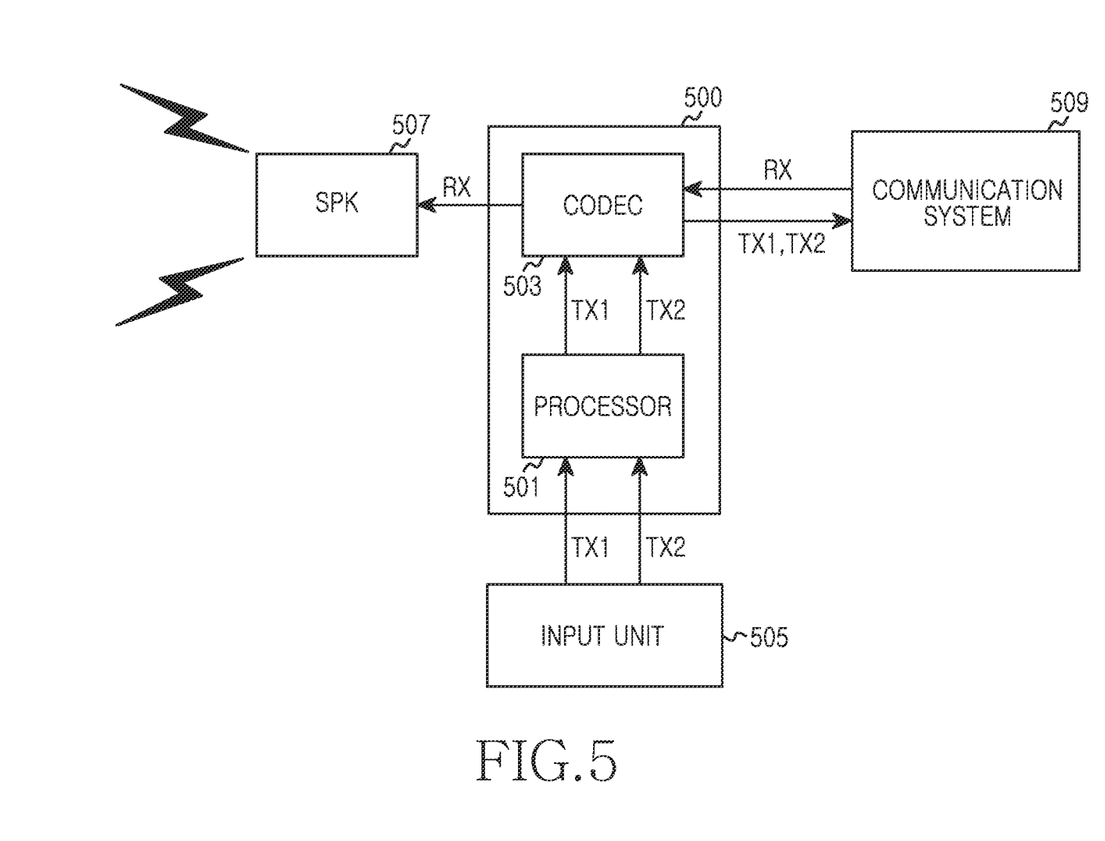
FIG. 5 is a view illustrating operations of an electronic device providing a voice call function according to an exemplary embodiment of the present invention.

In this case, a TX signal of FIG. 5 may be information notifying that a user inputs text data currently.

FIG. 5 is a view illustrating operations of an electronic device providing a voice call function according to an exemplary embodiment of the present invention.

Referring to FIG. 5, the electronic device controls a processor unit 500 configured with a processor 501 and a CODEC 503 to perform a voice call. The electronic device may also include an input unit 505, and may be coupled with a speaker 507 and a communication system 509.

That is, the processor unit of the electronic device may decode voice data of the other party received through a communication system to output the decoded voice data through a speaker. The processor unit may output voice data of the other party using a headset, a headphone, an earphone, or an ear set besides the speaker. In the drawing, an RX signal received from the other party is converted into an analog signal through the CODEC and the converted analog signal is output through a speaker.

In general, the electronic device converts audio data of a user inputted through a microphone into digital data using the CODEC, and delivers the converted digital data to the other party through a communication system.

Generating voice data by a user to deliver them to the other party means exposing delivery contents to other users around the user.

This is, private contents between a user and the other party may be exposed to other people and voice data occurrence may provide discomfort to others in a public place.

In order to address the above problems, an electronic device according to embodiments of the present invention may provide a voice call function using text data.

In order to use the above function, a user inputs contents to be transmitted as voice data as text data instead of delivering contents to the other party using voice data.

Accordingly, the processor unit of the electronic device may convert text data inputted by a user into voice data and then provide the converted voice data to the other party through the CODEC and the communication system.

However, it takes a predetermined time required for converting text data inputted by a user into audio data into audio data and transmitting the converted audio data to the other party. Due to this, the other party may determine that a call connection is terminated because no information is provided from the user. In order to solve the above problems, a processor unit according to embodiments of the present invention may notify the other party that data for voice call are being inputted while text data are inputted by a user.

In FIG. 5, a TX1 signal means that a user inputs text data, and a TX2 signal means that text data inputted by a user are converted into audio data.

That is, the processor unit may output data received from the other party as audio signals, and may generate contents to be delivered to the other party through text data input.

In embodiments, the processor unit may confirm that an input unit is controlled by a user and may generate an audio signal notifying the other party of this situation through the CODEC and the communication system.

Figure 6:
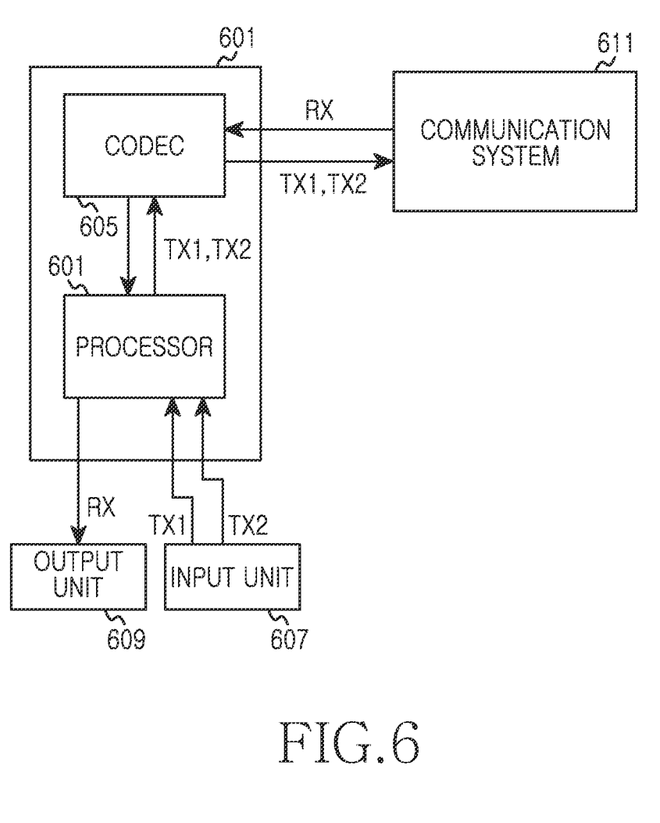
FIG. 6 is a view illustrating operations of an electronic device providing a voice call function according to an exemplary embodiment of the present invention.

FIG. 6 is a view illustrating operations of an electronic device providing a voice call function according to an exemplary embodiment of the present invention.

Referring to FIG. 6, the electronic device controls a processor unit 601 configured with a processor 603 and a CODEC 605 to perform a voice call. The electronic device may also include an input unit 607, an output unit 609, and may be coupled with a communication system 611.

In general, the processor unit of the electronic device decodes voice data of the other party received through a communication system to output the decoded voice data through a speaker. The processor unit may output voice data of the other party using a headset, a headphone, an earphone, or an ear set besides the speaker.

In embodiments, the processor unit converts audio data of a user inputted through a microphone into digital data using the CODEC, and delivers the converted digital data to the other party through a communication system.

The above voice call may need to be limited in specific places such as meeting places and theaters.

In order to address the above problems, a processor unit of an electronic device according to embodiments of the present invention may provide a voice call function using text data.

In order to use the above function, an electronic device converts data (for example, audio data) into text data and outputs the converted text data instead of outputting audio data received from the other party through a speaker.

In embodiments, the processor unit receives contents to be transmitted as voice data as text data instead of delivering call contents to the other party using voice data.

That is, the processor unit outputs data (for example, audio data) received from the other party as text data and receives contents to be delivered to the other party as text data through an input unit.

In embodiments, the processor unit confirms an input unit is controlled by a user and generates an audio signal notifying this situation to provide it to the other party through the CODEC and the communication system.

In the drawing, an RX signal received from the other party is converted into an analog signal through the CODEC and then, the converted analog signal is converted into text data by the processor and is displayed on an output unit.

In embodiments, in FIG. 6, a TX1 signal means that a user inputs text data, and a TX2 signal means that text data inputted by a user are converted into audio data.

FIGS. 7A, 7B, 7C and 7D are views illustrating an operation of performing a voice call using text data in an electronic device according to an exemplary embodiment of the present invention.

Figure 7A:
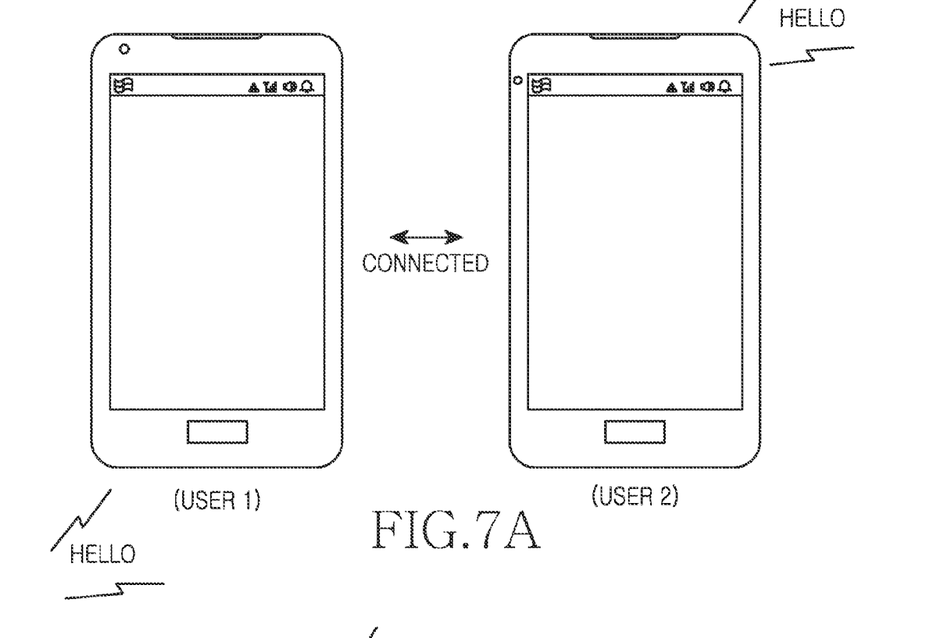
FIGS. 7A, 7B, 7C and 7D are views illustrating an operation of performing a voice call using text data in an electronic device according to an exemplary embodiment of the present invention.

For example, FIG. 7A illustrates a screen responding to the other party using text data in an electronic device.

Referring to FIG. 7A, an electronic device of a user 1 may perform a call connection with an electronic device of a user 2. At this point, the electronic device of the user 1 receives audio data of the user 1 through a microphone and then transmits the received audio data to the electronic device of the user 2. Accordingly, the audio data inputted by the user 1 are outputted through a speaker equipped in the electronic device of the user 2. That is, as shown in FIG. 7A, when the user 1 says "Hello" to the microphone of the electronic device of the user 1, the "Hello" is outputted through a speaker of the electronic device of the user 2.

In general, the user 2 transmits voice data to the user 1 through the above method so that a voice call is performed.

Figure 7B:
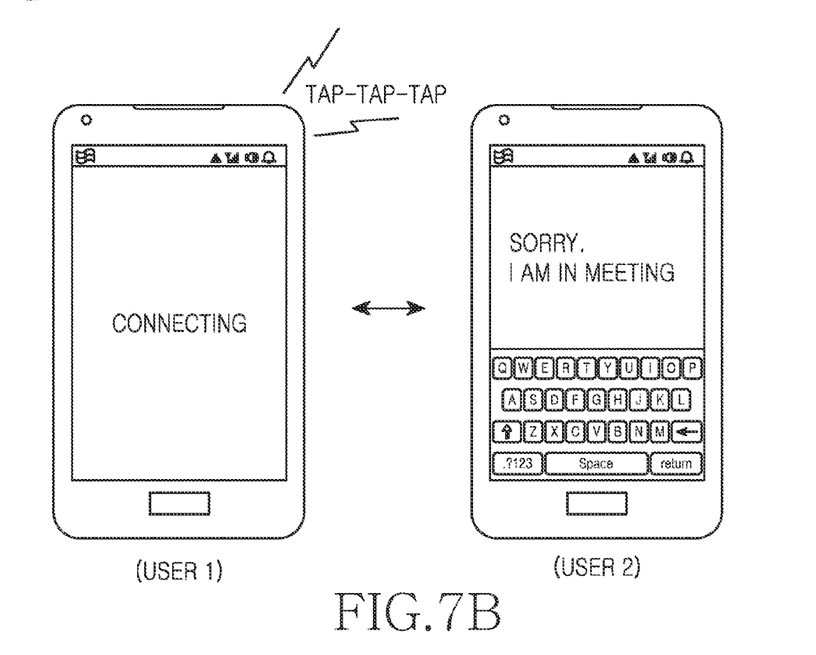

As shown in FIG. 7B, an electronic device according to embodiments of the present invention may process and transmit audio data to the other party using text data.

That is, when the user 2 does not generate audio data, as shown in FIG. 7B, contents (for example, contents indicating that the user 2 is in a meeting) to be delivered to the user 1 are inputted as text data.

In embodiments, the electronic device of the user 2 provides information indicating that the user 2 currently inputs text data to the electronic device of the user 1, and thus, as shown in the drawing, the electronic device of the user 1 outputs audio data of "Tap-Tap-Tap", so that it indicates that the other party inputs text data currently.

Figure 7C:
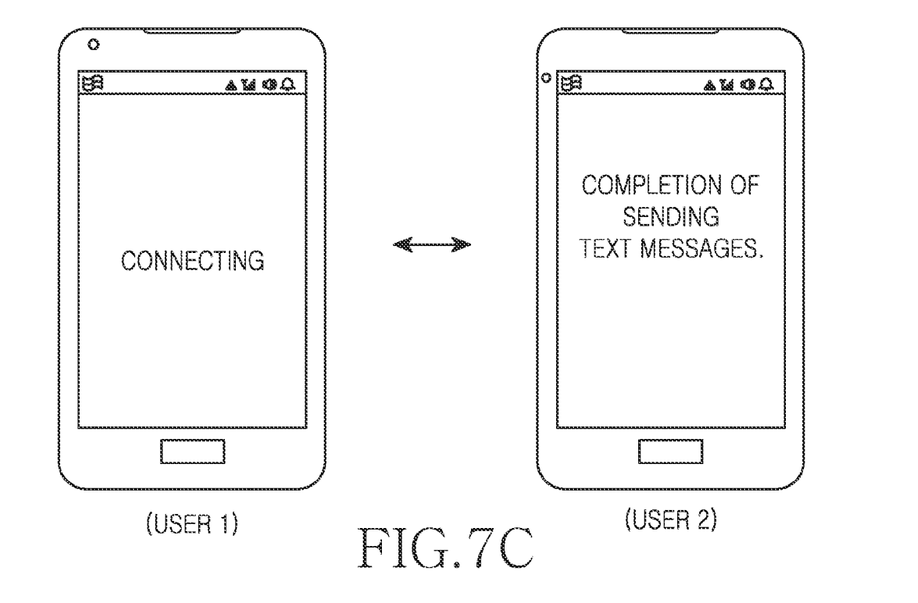

FIG. 7C illustrates a screen configured to perform a voice call using text data in an electronic device.

Referring to FIG. 7C, an electronic device of a user 1 and an electronic device of a user 2 communicate with each other, and the user 2 writes contents to be transmitted to the user 1 as text data as shown in FIG. 7B.

Figure 7D:
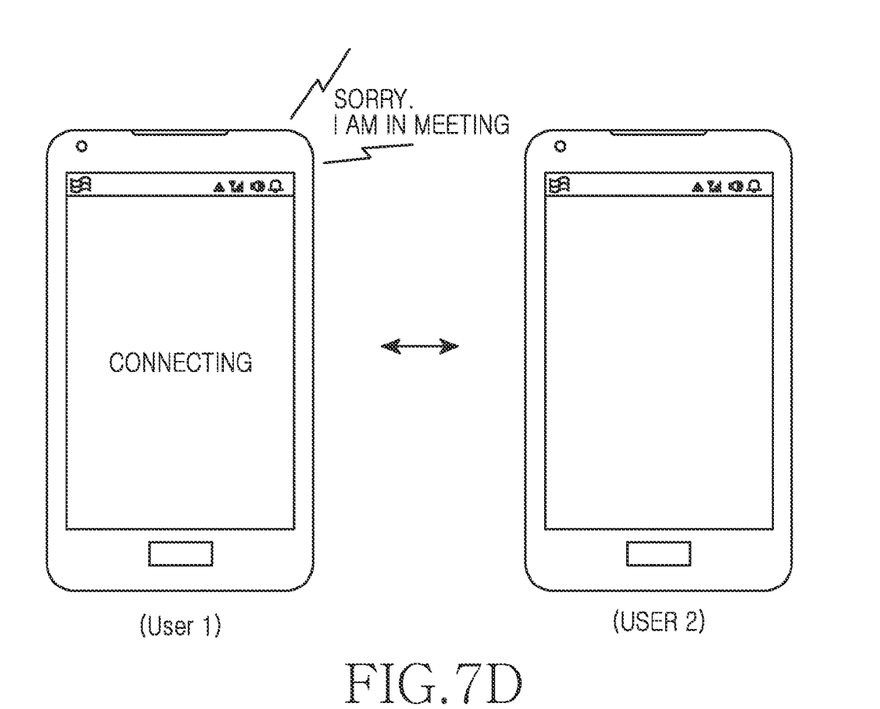

As shown in FIG. 7D, when the user 2 completes an input of data to be transmitted to the user 1, as shown in FIG. 7C, the electronic device of the user 2 may convert text inputted by the user 2 into audio data, and then transmit the converted audio data to the user 1.

That is, since the user 2 inputs contents to be transmitted as text data but the electronic device of the user 2 converts the text data into audio data, the user 1 may receive the audio data from the user 2.

Due to this, the electronic device of the user 1 outputs the received audio data through a speaker so that a voice call with the user 2 may be maintained.

That is, as shown in FIG. 7D, the electronic device of the user 2 may convert text data inputted by the user 2 into audio data, and then transmit the converted audio data to the electronic device of the user 1 so that the electronic device of the user 1 may output the received audio data through a speaker.

Figure 8:
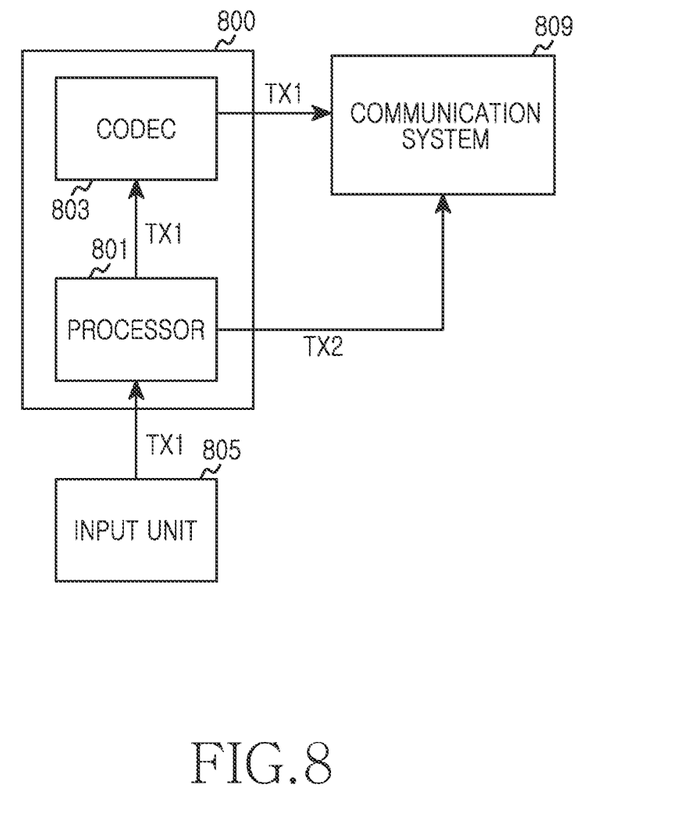
FIG. 8 is a view illustrating operations of an electronic device providing a voice call function according to an exemplary embodiment of the present invention.

FIG. 8 is a view illustrating operations of an electronic device providing a voice call function according to an exemplary embodiment of the present invention.

Referring to FIG. 8, the electronic device controls a processor unit 800 configured with a processor 801 and a CODEC 803 to perform a voice call. The electronic device may also include an input unit 805, and may be coupled with a communication system 809.

In general, the processor unit 800 of the electronic device decodes voice data of the other party received through a communication system and outputs the decoded voice data through a speaker. The processor unit 800 may output voice data of the other party using a headset, a headphone, an earphone, or an ear set besides the speaker.

In embodiments, the processor unit may convert voice data of the other party received according to embodiments of the present invention into text data and then may output the converted text data.

In embodiments, the processor unit may receive contents to be transmitted as voice data as text data instead of delivering call contents to the other party using voice data.

In embodiments, the processor unit may confirm that an input unit is controlled by a user and may generate an audio signal notifying the other party of this situation through the CODEC and the communication system.

Such an operation may be confirmed through what is described in connection with FIGS. 4 to 6.

In embodiments, the process unit may process and transmit various data such as video data and icons that are pre-stored to notify that text data are being entered to the other party.

In embodiments, since the video data and icons that are pre-stored to notify that text data are being entered do not need to be converted into digital data, the processor unit may provide the video data and icons to the other party immediately through the communication system. That is, when an icon indicating that a user is in a meeting is selected, the processor unit detecting a text data input of a user may transmit the icon to the other party.

In FIG. 8, a TX1 signal means that text data inputted by a user are converted into audio data and transmitted to the other party, and a TX2 signal means information indicating that a user inputs text data currently. That is, the TX2 signal may be directly transmitted to the other party through inter-process communication (IPC) between the processor and the communication system, without passing through the CODEC.

Figure 9A:
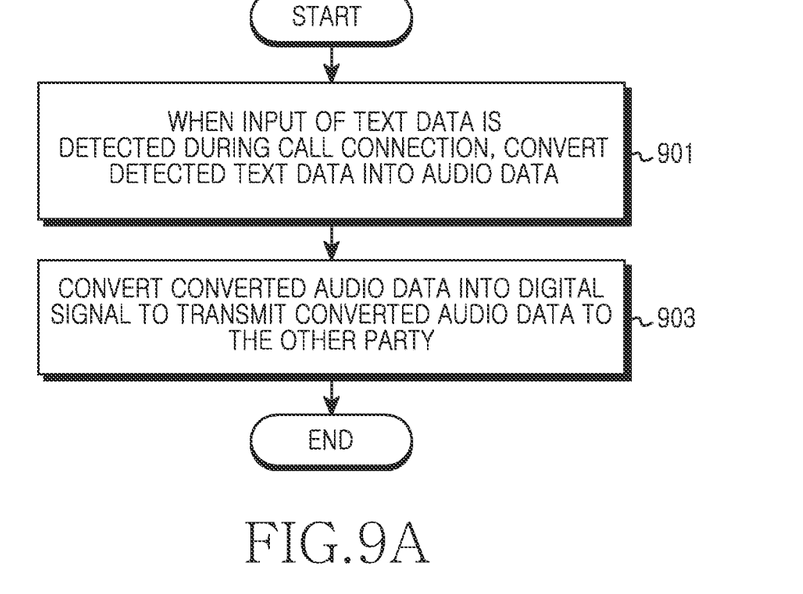
FIG. 9A is a flowchart illustrating an operation of performing a voice call using text data in an electronic device according to an exemplary embodiment of the present invention.

FIG. 9A is a flowchart illustrating an operation of performing a voice call using text data in an electronic device according to an exemplary embodiment of the present invention.

Referring to FIG. 9A, when the electronic device detects an input of text data during call connection, step 901 for converting the detected text data into audio data and step 903 for converting the audio data into digital signals and transmitting the converted digital signals to the other party may be performed.

When an input of text data is detected during the call connection, step 901 for converting the detected text data into audio data includes confirming whether a user writes voice contents to be delivered to the other party as text data and converting the contents to be written as text data into audio data.

This is to receive contents to be provided to the other party using text input when a user may not generate audio data. That is, this means that a user of the electronic device may write contents to be delivered to the other party as text instead of inputting the contents as voice.

In embodiments, the electronic device may receive text data from a user after activating a text data input mode during call connection. Accordingly, the electronic device may determine that text data input is completed when a completion button (or a send button) of a text data input function is inputted.

Step 903 for converting the audio data into digital signals and transmitting the converted digital signals to the other party may include converting audio data including the contents of the text data into digital signals and transmitting the converted digital signals to the other party.

An instruction set for each step of FIG. 9A may be included in the data conversion program 114 and in the CODEC program 115 of the memory 110 of FIG. 1, and the programs 114 and 115 may be executed by at least one processor.

In embodiments, the electronic device may generate information notifying that a user writes voice contents to be delivered to the other party as text data, if necessary. When an input of text data is detected during the call connection, such a step may be included in step 901 for converting the detected text data into audio data.

In embodiments, the electronic device may convert audio data from the other party into text data and then, may output the converted text data, if necessary.

Figure 9B:
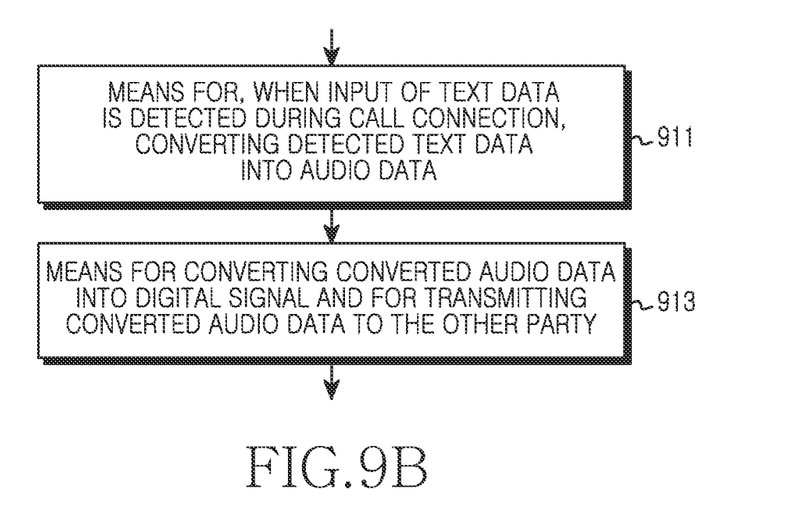
FIG. 9B is a view illustrating a configuration of an electronic device providing a voice call function using text data according to an exemplary embodiment of the present invention.

FIG. 9B is a view illustrating a configuration of an electronic device providing a voice call function using text data according to an exemplary embodiment of the present invention.

Referring to FIG. 9B, when the electronic device detects an input of text data during call connection, embodiments include a means 911 for converting the detected text data into audio data, and a means 913 for converting the converted audio data into digital signals and for transmitting the converted digital signals to the other party.

When an input of text data is detected during the call connection, the means 911 for converting the detected text data into audio data confirms whether a user writes voice contents to be delivered to the other party as text data and converts the contents written as text data into audio data.

This is to receive contents to be provided to the other party using text input when a user may not generate audio data. That is, a user of the electronic device may write contents to be delivered to the other party as text instead of inputting the contents as voice.

The means 911 may receive text data from a user after activating a text data input mode during call connection. Accordingly, the means 911 determines that text data input is completed when a completion button (or a send button) of a text data input function is inputted.

The means 913 for converting the converted audio data into digital signals and transmitting the converted digital signals to the other party may convert audio data including the contents of the text data into digital signals and then, transmits the converted digital signals to the other party.

Each means may be configured with separate hardware or with one hardware.

According to an electronic device and method for allowing a voice call with the other party using text input, a user performs a voice call with the other party through text input and notifies the other party that text is being entered, so that a smooth voice call may be performed with the other party in a voice call unavailable environment.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method in an electronic device, the method comprising:
   generating information notifying that text data are being entered and transmitting the generated information to another party before the text data are converted into audio data when an input of the text data is detected during call connection;
   converting the detected text data into audio data when the input of the text data is detected during call connection; and
   converting the converted audio data into a digital signal to transmit the converted digital signal to the other party.

2. The method of claim 1, wherein the information notifying that text data are being entered uses at least one of audio data, video data, and icons.

3. The method of claim 1, further comprising converting audio data received from the other party during call connection into text data, and outputting the converted text data.

4. The method of claim 1, wherein the converting of the detected text data into the audio data when the input of the text data is detected during the call connection comprises activating a text data input mode when an instruction for converting text data into audio data is detected during the call connection.

5. The method of claim 1, wherein the converting of the detected text data into audio data performed by a Text To Speech (TTS) program and the converting of the converted audio data into a digital signal is performed by coder-decoder (CODEC) program.

6. An electronic device, the device comprising:
   at least one processor;
   a memory; and
   at least one program stored in the memory and configured to be executed by the at least one processor,
   wherein the at least one program comprises an instruction that, when an input of text data is detected during call connection, generates information notifying that text data are being entered, transmits the generated information to another party before converting the detected text data into audio data, converts the detected text data into audio data and converts the converted audio data into a digital signal to transmit the converted digital signal to the other party.

7. The device of claim 6, wherein the at least one program comprises an instruction using the information notifying that the text data are being entered using at least one of audio data, video data, and icons.

8. The device of claim 6, wherein the at least one program comprises an instruction for converting audio data received from the other party during call connection into text data, and for outputting the converted text data.

9. The device of claim 6, wherein the at least one program comprises an instruction that, when an instruction that converting text data into audio data during the call connection is detected, activates a text data input mode.

10. The device of claim 6, wherein the at least one program comprises at least one of a Text To Speech (TTS) program and a coder-decoder (CODEC) program.

11. A non-transitory computer readable recording medium having at least one program with instructions recorded thereon, which, when executed by an electronic device, implements the method of claim 1.

* * * * *